United States Patent
Corcoran

(10) Patent No.: US 9,163,159 B2
(45) Date of Patent: Oct. 20, 2015

(54) CROSSLINKING AGENT FOR ADHESION TO PLASTIC

(75) Inventor: Patrick Henry Corcoran, Cherry Hill, NJ (US)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 681 days.

(21) Appl. No.: 13/505,576

(22) PCT Filed: Nov. 4, 2010

(86) PCT No.: PCT/US2010/055356
§ 371 (c)(1),
(2), (4) Date: May 2, 2012

(87) PCT Pub. No.: WO2011/056912
PCT Pub. Date: May 12, 2011

(65) Prior Publication Data
US 2012/0220710 A1    Aug. 30, 2012

Related U.S. Application Data

(60) Provisional application No. 61/257,882, filed on Nov. 4, 2009.

(51) Int. Cl.
*C08G 65/329* (2006.01)
*C08L 67/02* (2006.01)
*C08G 18/10* (2006.01)
*C09D 175/04* (2006.01)
*C08G 18/62* (2006.01)
*C08G 18/75* (2006.01)

(52) U.S. Cl.
CPC .............. *C09D 175/04* (2013.01); *C08G 18/10* (2013.01); *C08G 18/6208* (2013.01); *C08G 18/755* (2013.01)

(58) Field of Classification Search
USPC .................. 525/329.9, 396, 425, 434, 440.02
See application file for complete search history.

(56) References Cited

U.S. PATENT DOCUMENTS 4,851,485 A * 7/1989 Re et al. .................... 525/504
5,877,261 A * 3/1999 Harder et al. .......... 428/355 AC

OTHER PUBLICATIONS

Prabu et al., Mechanical and thermal studies of intercross-linked networks based on siliconized polyurethane-epoxy/unsaturated polyester coatings, Progress in Organic Coating 49 (2004) 236-243, Alagappa College of Technology.*

* cited by examiner

*Primary Examiner* — Ling Choi
*Assistant Examiner* — Thuy-Ai Nguyen
(74) *Attorney, Agent, or Firm* — Ingrassia Fisher & Lorenz, P.C.

(57) ABSTRACT

The present disclosure relates to an isocyanate terminated saturated hydrocarbon polymer that can be used as a crosslinking agent in a coating composition. The coating composition can provide a composition that adheres well to resinous substrates. Also provided are coating composition comprising the crosslinking agent and methods for producing the adherent coating composition.

13 Claims, No Drawings

CROSSLINKING AGENT FOR ADHESION TO PLASTIC

CROSS-REFERENCE TO RELATED APPLICATIONS

This application is a U.S. National-Stage entry under 35 U.S.C. §371 based on International Application No. PCT/US2010/055356, filed Nov. 4, 2010, which was published under PCT Article 21(2) and which claims priority to U.S. Provisional Application No. 61/257,882, filed Nov. 4, 2009, which are all hereby incorporated in their entirety by reference.

FIELD OF THE DISCLOSURE

The present disclosure is directed to a crosslinking agent that can form an adherent coating on a resinous substrate.

BACKGROUND OF DISCLOSURE

Resinous materials, such as thermoplastic olefins (TPO), sheet molding compounds (SMC), engineering polymers, such as NORYL GTX® polyamide (PA) reinforced with a modified polyphenylene ether polymer (PPE) supplied by GE Company, and reaction injection molded (RIM) polyurethane are used in many applications, such as automobile parts and accessories, containers, household appliances and other commercial items. It is often desirable to coat articles made from such resinous materials with coatings that are aesthetically pleasing. Such coatings are also used to protect such articles from degradation when exposed to atmospheric weathering conditions, such as sunlight, moisture, heat and cold. To produce longer lasting and more durable articles from resinous materials, it is necessary for the coatings to tightly adhere to the surface of such articles.

Resinous substrates made from a variety of thermoplastic and thermosetting resinous materials have widely varying surface properties, including surface tension, roughness, flexibility, and have widely varying bulk properties such as solubility parameter, which make it difficult to achieve adequate adhesion of the coatings to such materials, particularly upon aging or environmental exposure of the resinous materials. It is well known to apply an adhesion promoter or tie coat on a resinous substrate surface to improve adherence of the coating to the surface. The application of an adhesion promoter or tie coat is normally an added step in the coating process. The adhesion promoter is usually applied in a thin layer, normally about 5 to 7 micrometers. Typically, adhesion promoters used on TPO plastic surfaces contain chlorinated polyolefins, some examples of which are described in U.S. Pat. Nos. 4,997,882; 5,319,032 and 5,397,602. Additionally, flame or corona pretreatment steps can be also used to facilitate adequate adhesion of organic coatings to some resinous substrates.

The use of adhesion promoters and/or corona pretreatments in a coating system used to coat resinous substrates, adds complexity and cost to the system. The application of an adhesion promoter usually entails coating the resinous substrate with the promoter, followed by some drying or curing time which increases the time of the entire coating process and will usually necessitate additional workspace. Accordingly, coating compositions which exhibit excellent adhesion directly to resinous materials, such as TPO and NORYL GTX® polyamide without the use of adhesion promoters or tie coats are desirable.

Polyolefin diols have been used in coating compositions to impart adhesion to the resinous substrate without the use of adhesion promoters or tie coats. However, polyolefin diols may be incompatible with the resins and/or crosslinking agents used in some coating compositions. For example, U.S. Pat. No. 6,203,913 discloses an adhesion promoter containing a mixture of one or more conventional crosslinkable film forming resins having crosslinkable groups, such as those from polyesters, and acrylic polymers; one or more conventional crosslinking-materials that are capable of reacting with film forming resins, such as aminoplasts and isocyanates; and an adhesion promoting agent, such as polyolefin diol. However, a need still exists to improve compatibility of the adhesion-promoting agent, film forming resins and crosslinking materials in such coating compositions.

STATEMENT OF THE DISCLOSURE

The present disclosure relates to a coating composition and a crosslinking agent comprising an isocyanate terminated saturated hydrocarbon polymer having a structure according to formula (I), formula (II) or a combination thereof;

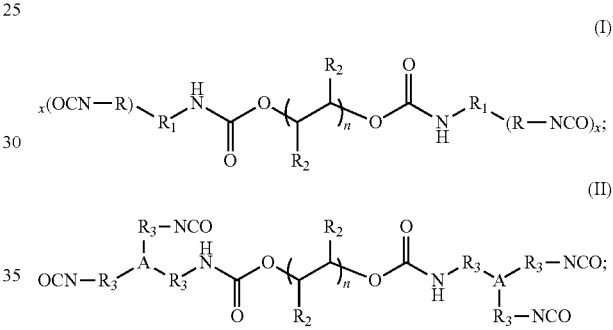

wherein;
each x independently ranges from 1 to 10;
each R is independently selected from the group consisting of a direct bond and a C1 to C8 alkyl group;
each $R_1$ is independently selected from the group consisting of an unsubstituted C3 to C20 carbocyclic group and a C3 to C20 carbocyclic group substituted with one or more C1 to C6 alkyl groups pendant the ring system;
each $R_2$ is independently selected from the group consisting of H and a C1 to C4 alkyl group;
each $R_3$ is independently a C3 to C20 carbocyclic group optionally substituted with one or more C1 to C6 alkyl groups;
each A is selected from the group consisting of an isocyanurate group, an iminooxadiazine dione group, an allophanate group or a biuret group; and
n ranges from 20 to 700.

DETAILED DESCRIPTION

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

"GPC number average molecular weight" means a number average molecular weight measured by utilizing gel permeation chromatography, such as high performance liquid chromatograph (HPLC) supplied by Hewlett-Packard, Palo Alto, Calif. Unless stated otherwise, tetrahydrofuran was used as the liquid phase and polystyrene standards were used.

"Tg" (glass transition temperature) means a temperature measured in ° C. determined by DSC (Differential Scanning Calorimetry) at a rate of heating of 10° C. per minute, with Tg taken at the first inflection point. The Tg of a polymer is a measure of the hardness and melt flow of the polymer. The higher the Tg, the less the melt flow and the harder the coating. Tg is described in Principles of Polymer Chemistry (1953), Cornell University Press. The Tg can be actually measured or it can be calculated as described by Fox in Bull. Amer. Physics Soc., 1, 3, page 123 (1956). Tg, as used herein, refers to actually measured values.

"(Meth)acrylate" means acrylate and methacrylate.

"Polymer solids" or "composition solids" means a polymer or composition in its dry state.

"Alkyl" means one or more $CH_3$, $CH_2$, CH or C groups covalently bonded to one another with carbon-carbon single bonds. The word alkyl can be modified by "Cn" wherein n represent the total number of carbon atoms in the alkyl group, as in, for example, a C1 to C6 alkyl group. Additionally, a substituted alkyl group is an alkyl group that additionally contains one or more non-carbon, atoms covalently bonded to the alkyl group.

"Carbocyclic group" means a group comprising one or more ring systems wherein the atoms that form the ring comprise only carbon atoms. While non-carbon atoms may be pendant to the ring system, the ring system itself contains only carbon atoms. Examples of carbocyclic groups can include, for example, cyclohexane, toluene and bornane.

"Crosslinkable component" means a component that includes a compound, polymer, copolymer or a polydisperse mixture of compounds, polymers and/or copolymers all having functional groups positioned in the backbone, pendant from the polymer backbone, terminally positioned on the polymer backbone; or a combination thereof, wherein the functional groups are capable of crosslinking with the functional groups on the crosslinking component (during the curing step) to producer coating in the form of crosslinked structures. In some embodiments, the functional group of the crosslinkable component can be selected from the group consisting of hydroxyl, amino, carboxylic acid, epoxy, carbamate, thiol, acetoacetoxy, orthoformate, amide acetal or a combination thereof.

"Crosslinking component" is a component that includes a compound, polymer, oligomer, copolymer or a polydisperse mixture of compounds, polymers, oligomers, and/or copolymers all having functional groups-positioned in the backbone, pendant from the polymer backbone, terminally positioned on the polymer or oligomer backbone; or a combination thereof, wherein these functional groups are capable of crosslinking with the functional groups on the crosslinkable component (during the curing step) to produce a coating in the form of crosslinked structures. In some embodiments, the crosslinking component can be selected from the group consisting of isocyanate, blocked isocyanate or a combination thereof.

"Ambient cure condition" is generally defined as the temperature range of 12° C. to 45° C. (54° F. to 113° F.) and a humidity range of 5 percent to 95 percent that is present in the application area.

"Untreated resinous substrate" means a thermoplastic or thermosetting substrate that has not been pretreated using any means to increase the adhesion of a subsequent coating applied over the substrate. Such treatment methods are well known in the art, such as flame or corona treatments or treating the resinous surface with an adhesion promoter or tie coat to help increase adhesion to the coating composition. Each of the adhesion-promoting methods can increase the complexity and cost of coating such substrate. The resinous substrates suitable for use in the present disclosure can include any of the thermoplastic or thermosetting synthetic materials commonly used in injection molding, sheet molding, blow molding, vacuum forming or other similar process in which parts are formed. In some embodiments, the resinous substrate can include, for example, those made from isotactic polypropylene reinforced with a polyethylene alpha-olefin copolymer, polyamide reinforced with a polyphenyleneether, sheet molding compound or a copolymer of acrylonitrile, butadiene and styrene (ABS). However, reaction injection molding compounds (RIMs) are not part of this disclosure unless they have been reinforced (RRIMs) with conventional reinforcing agents, such as short glass fibers or mineral fillers (mica, wollastonite and others). One example of suitable RRIM is known as BAYFLEX® 190 polyurethane/polyurea RRIM system (reinforced with 15% mica) from Bayer MaterialScience, Pittsburgh, Pa.

"Two-pack coating composition" means a curable coating composition having two components stored in separate containers. The containers containing the two components are typically sealed to increase the shelf life of the components of the coating composition. One such component of the two-pack coating composition is a crosslinkable component and the other is a crosslinking component. These components are mixed prior to use to form a pot mix. The pot life of a pot mix is limited, typically to a few minutes (10 minutes to 45 minutes) to a few hours (4 hours to 24 hours). The crosslinking component of this composition includes polyisocyanates. The pot mix is applied as a layer of a desired thickness on a substrate surface, such as an auto body. After application, the layer dries and cures at ambient or elevated temperatures to form a coating on the substrate surface having desired coating properties, such as improved adhesion and chip resistance.

"One-pack coating composition" means a curable coating composition having both the crosslinkable component and the crosslinking component stored together in one pack. The crosslinking component of this composition is selected from the group consisting of blocked polyisocyanates, and mixtures thereof. Typical blocking agents for polyisocyanates include alcohols, ketimines, and oximes. One-pack coating compositions are applied to a suitable substrate and are cured at elevated temperatures to form a durable coating. Since the coating composition of the present disclosure is directed to a composition that adheres to plastic substrates, the curing temperature should be below that of the softening point of the substrate when formulating and curing a one-pack coating composition. A two-pack coating composition is preferred.

It has been found that an adherent coating can be produced using a crosslinking agent wherein the crosslinking agent comprises an isocyanate terminated saturated hydrocarbon polymer having a structure according to formula (I), formula (II) or a combination thereof;

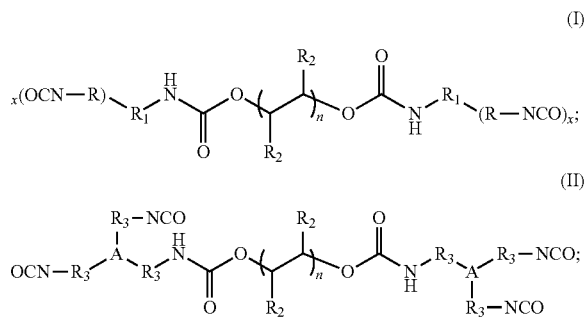

wherein;
each x independently ranges from 1 to 10;
each R is independently selected from the group consisting of a direct bond and a C1 to C8 alkyl group;
each $R_1$ is independently selected from the group consisting of an unsubstituted C3 to C20 carbocyclic group and a C3 to C20 carbocyclic group substituted with one or more C1 to C6 alkyl groups pendant the ring system;
each $R_2$ is independently selected from the group consisting of H and a C1 to C4 alkyl group;
each $R_3$ is independently a C3 to C20 carbocyclic group optionally substituted with one or more C1 to C6 alkyl groups;
each A is selected from the group consisting of an isocyanurate group, an iminooxadiazine dione group, an allophanate group or a biuret group; and
n ranges from 20 to 700.

Suitable carbocyclic groups can include, for example, structures according to;

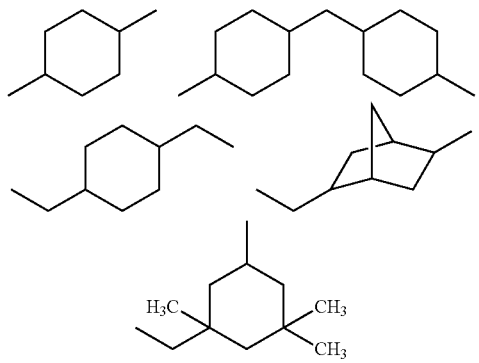

In some embodiments, the isocyanate terminated saturated hydrocarbon polymer can be the reaction product of a saturated hydrocarbon polymer with a polyisocyanate. The polyisocyanate can be a diisocyanate, a triisocyanate, a polyisocyanate having more than three isocyanate groups per molecule or a combination thereof. Suitable polyisocyanates are carbocyclic polyisocyanates, such as, for example, isophorone diisocyanate, isomers of bis(isocyanatomethyl)cyclohexane, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane-4,4'-diisocyanate or derivatives thereof. Suitable derivatives include, for example, isocyanurates, iminooxadiazine diones, allophanates or biurets of any of the above listed diisocyanates.

In some embodiments, the isocyanate terminated saturated hydrocarbon polymer can be formed by the reaction of an excess of isocyanate groups for each hydroxyl group in the saturated hydrocarbon polymer. In other embodiments, the isocyanate terminated saturated hydrocarbon polymer can be formed from a reaction mixture using a ratio of isocyanate groups to hydroxyl groups that is in the range of from 1:0.99 up to 100:1. In other embodiments, the ratio of isocyanate to hydroxyl can be in the range of from 50:1 to 10:1, and, in other embodiments, the ratio of isocyanate to hydroxyl can be in the range of from 30:1 to 15:1.

In some embodiments, the reaction product, containing the disclosed isocyanate terminated saturated hydrocarbon polymer along with any excess polyisocyanate can be used without a purification step as the crosslinking agent for a coating composition. The isocyanate terminated saturated hydrocarbon polymer along with any unreacted polyisocyanates can be described as an isocyanate terminated saturated hydrocarbon polymer mixture. The presence of the isocyanate terminated saturated hydrocarbon polymer mixture as a crosslinking component can produce a coating composition that is adherent to an untreated resinous substrate.

In some embodiments, the isocyanate terminated saturated hydrocarbon polymer mixture can be the sole crosslinking agent in a coating composition. In other embodiments, additional polyisocyanates can be added to the isocyanate terminated saturated hydrocarbon polymer mixture. In some embodiments, the additional polyisocyanates can comprise in the range of from 0 to 90 percent by weight of the total amount of polyisocyanates. In other embodiments, the additional polyisocyanates can comprise in the range of from 10 to 88 percent by weight of the total amount of polyisocyanates.

Suitable additional polyisocyanates can include, for example, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, trans-vinylidene diisocyanate, toluene diisocyanate, 1,3-bis(1-isocyanato 1-methylethyl)benzene, 1,4-bis(1-isocyanato-1-methylethyl)benzene, 1,3-bis(isocyanatomethyl)benzenexylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, diisocyanatonaphthalene, and combination thereof. Any of the above mentioned derivatives of these diisocyanates can also be used.

A "saturated hydrocarbon polymer", means a hydrocarbon polymer or copolymer containing about 85 to about 99 weight percent of hydrocarbon units. In some embodiments, the saturated hydrocarbon polymer contains less than about 13 percent by weight of heteroatoms, such as oxygen, nitrogen and sulfur. In other embodiments, the saturated hydrocarbon polymer contains less than 6 percent by weight of heteroatoms. In other embodiments, the saturated hydrocarbon polymer contains less than 3 percent heteroatoms, and in still further embodiments, contains less than 1 percent heteroatoms. Typically, the number average molecular weight of the saturated hydrocarbon polymer ranges from about 500 to 20,000. In other embodiments, these polymers can have a Mn ranging from about 800 to about 17,500 and in still further embodiments, about 1,000 to about 8,000 grams per mole. The saturated hydrocarbon polymers can have, on average, from 1.5 to 6 and more preferably from 2 to 4 hydroxyl groups per polymer chain.

Suitable saturated hydrocarbon polymers contain an average of more than one terminal or pendant functional group per molecule, which is capable of reacting with the carbocyclic polyisocyanate. In some embodiments, the saturated hydrocarbon polymer, which can be present as a mixture of different saturated hydrocarbon polymers, containing an average of about 1.5 to about 6 terminal or pendent functional groups per molecule. In still further embodiments, the saturated hydrocarbon polymer contains two terminal functional groups per molecule.

The functional groups of the saturated hydrocarbon polymer can be carboxyl groups, carbamate groups, hydroxyl groups, amino groups, epoxy groups, mercaptan groups and a combination thereof. In some embodiments, the functional groups are hydroxyl groups. In particular embodiments, the saturated hydrocarbon polymer contains two terminal hydroxyl groups.

The saturated hydrocarbon polymer is at least "substantially saturated", i.e., the hydrocarbon polymer has been hydrogenated, usually after polymerization, such that at least about 90 percent and preferably at least about 95 percent of the carbon to carbon double bonds of the hydrocarbon polymer are saturated. Methods for hydrogenating unsaturated hydrocarbon polymers are well known to those skilled in the art. Examples of useful hydrogenation processes include hydrogenation in the presence of catalysts, such as Raney Nickel; noble metals, such as platinum; soluble transition metal catalysts; and titanium catalysts disclosed in U.S. Pat. No. 5,039,755.

In some embodiments, the saturated hydrocarbon polymer can be produced using isoprene or butadiene monomers, as described in U.S. Pat. No. 5,486,570 and U.S. Pat. No. 5,376,745, which are substantially saturated, are suitable for use in the present disclosure. Polymers of this type can have a hydroxyl equivalent weight of between about 500 and about 20,000. In some embodiments, the saturated hydrocarbon polymer can be a hydrogenated dihydroxy polybutadiene resin which contains about two terminal hydroxyl groups, one at each end of the polymer, and has a hydroxyl equivalent weight in the range of from 1,000 to 5000.

In other embodiments, the saturated hydrocarbon polymers can include those synthesized by free radical polymerization of dienes or anionic polymerization of conjugated diene hydrocarbons, such as butadiene or isoprene, with lithium initiators. The process steps for preparing polyhydroxylated polydiene polymers by anionic polymerization are described in U.S. Pat. No. 4,039,593; Re. 27,145; and U.S. Pat. No. 5,376,745. Such polymers can be made with a dilithium initiator, such as, for example, a compound formed by reaction of two moles of sec-butyllithium with one mole of diisopropylbenzene. In some embodiments, the polymerization of the diene monomers can be performed in a solvent composed of 90 percent by weight cyclohexane and 10 percent by weight diethylether. In some embodiments, the polymer is capped with two moles of ethylene oxide and terminated with two moles of methanol to produce the dihydroxy polybutadiene which can then be hydrogenated according to known methods. In other embodiments, the saturated hydrocarbon polymer can be a telechelic polymeric diol, a linear copolymer polymerized from butadiene. Suitable saturated hydrocarbon polymers can include, for example, KRATON® liquid polymers HPVM 2200 series and Shell Diol L-2203, which are commercially available from Shell Chemical Co, Houston, Tex. and KRASOL® HLBH-P 3000 from Sartomer Resins, West Chester, Pa.

In some embodiments, the saturated hydrocarbon polymers can have at least about 90 weight percent repeat units derived from conjugated dienes. The monomers used to form the polymers can include olefins having from 2 to 6 carbon atoms such as are disclosed in U.S. Pat. No. 4,518,753 and U.S. Pat. No. 3,652,732. In other embodiments, the saturated hydrocarbon polymers can be formed from up to 50 mole percent of ethylenically unsaturated comonomers having from 2 to 10 carbon atoms and substituents including aromatics, halogens, cyanides, esters, and hydroxy esters. Examples of such polymers are hydroxyl terminated diene-based polymers including anionically polymerized dienes, which are given hydroxyl groups in the chain termination step, or free radically polymerized dienes such as those initiated with hydrogen peroxide. Suitable saturated hydrocarbon polymers are described in U.S. Pat. No. 5,115,007 and U.S. Pat. No. 5,221,707.

Also disclosed herein are coating compositions comprising the isocyanate terminated saturated hydrocarbon polymer as a crosslinking agent. The coating compositions can comprise a crosslinkable component and a crosslinking component wherein the crosslinking component comprises the isocyanate terminated saturated hydrocarbon polymer.

Coating compositions comprising the isocyanate terminated saturated hydrocarbon polymer can be one-pack coating compositions wherein the isocyanate groups of the isocyanate terminated saturated hydrocarbon polymer and any other isocyanate functional groups that are present in the isocyanate terminated saturated hydrocarbon polymer mixture are blocked with a blocking agent. Blocked isocyanate groups are common in the art and any of the known blocking agents and processes of forming blocked isocyanates can be used. Coating compositions comprising the isocyanate terminated saturated hydrocarbon polymer can also be two-pack coating compositions wherein one pack comprises the crosslinkable component and the other pack comprises the isocyanate terminated saturated hydrocarbon polymer and any additional polyisocyanates.

The crosslinkable component of the coating composition can be, for example, an acrylic copolymer conventionally polymerized by a thermally initiated solution polymerization process of a monomer mixture comprising ethylenically unsaturated monomers. Suitable ethylenically unsaturated monomers can include, for example, acrylic ester monomers, such as hydroxyl functional alkyl(meth)acrylates wherein alkyl group includes 1 to 4 carbon atoms. Some examples of hydroxyl functional alkyl(meth)acrylates include hydroxyethyl(meth)acrylate (primary), hydroxybutyl(meth)acrylate (all isomers, primary and secondary) and hydroxypropyl(meth)acrylate (all isomers, primary and secondary). The monomer mixture can further include the following ethylenically unsaturated monomers which include acrylic ester monomers, such as methyl(meth)acrylate, ethyl(meth)acrylate, butyl(meth)acrylate, cyclohexyl(meth)acrylate, 2-ethylhexyl(meth)acrylate, decyl(meth)acrylate, lauryl(meth)acrylate, isobornyl(meth)acrylate, isodecyl(meth)acrylate, oleyl (meth)acrylate, palmityl(meth)acrylate, stearyl(meth)acrylate, and acetoacetoxy ethyl(meth)acrylate; acrylamide or substituted acrylamides; styrene or alkyl substituted styrenes; butadiene; ethylene; vinyl acetate; vinyl ester of "Versatic" acid (a tertiary monocarboxylic acid having $C_9$, $C_{10}$ and $C_{11}$ chain length; vinyl monomers, such as, for example, vinyl chloride, vinylidene chloride, vinyl pyridine, N-vinyl pyrrolidone; amino monomers, such as, for example, N,N'-dimethylamino(meth)acrylate; chloroprene and acrylonitrile or methacrylonitrile; carboxyl monomers, such as acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate.

The monomer mixture can preferably further include styrene, methyl(meth)acrylate, cyclohexyl(meth)acrylate, benzyl(meth)acrylate, isobornyl(meth)acrylate, ethylhexyl(meth)acrylate, butyl(meth)acrylate, isobutyl(meth)acrylate, laurel(meth)acrylate, propyl(meth)acrylate, isopropyl(meth)acrylate, (meth)acrylic acid, itaconic acid, or a combination thereof.

The crosslinkable copolymer can be also prepared by solution polymerization in which the monomer mixture, conventional solvents, polymerization initiators, such as, for example, an azo- or peroxy-initiator, are heated to 70° C. to 175° C. for 1 to 12 hours.

The crosslinkable component can contain, in the range of from 0.1 percent to 50 percent based on the weight of the crosslinkable and crosslinking components of a flow modifying polymer, such as a non-aqueous dispersion (NAD), all percentages being based on the total weight of composition solids.

The non-aqueous dispersion can be prepared by dispersion polymerizing at least one vinyl monomer in the presence of a polymer dispersion stabilizer and an organic solvent. The polymer dispersion stabilizer may be any of the known stabilizers used commonly in the field of non-aqueous dispersions.

The crosslinkable component of the present disclosure can be also blended with reactive oligomers covered in U.S. Pat. No. 6,221,494, and non-alicyclic (linear or aromatic) oligomers, if desired. Such non-alicyclic-oligomers can be made by using non-alicyclic anhydrides, such as succinic or phthalic anhydrides, or mixtures thereof. Caprolactone oligomers described in U.S. Pat. No. 5,286,782 can also be used.

The crosslinkable component can further include polyesters, acrylic polymers, polyethers, polyols or a combination thereof.

The crosslinkable component can further include one or more conventional crosslinking catalysts, such as organo tin catalysts, which include dibutyl tin dilaurate, dibutyl tin diacetate, stannous octoate, and dibutyl tin oxide. Dibutyl tin dilaurate is preferred. The crosslinkable component typically includes in the range of from 0.001 parts to 5 parts, preferably in the range of from 0.005 parts to 2 parts, more preferably in the range of from 0.01 parts to 1 part of said crosslinking catalyst, all in parts by weight based on 100 parts by weight of said crosslinkable and said crosslinking components.

The composition typically includes one or more solvents such as organic solvent selected from aromatic hydrocarbons, such as petroleum naphtha of xylenes; ketones, such as, methyl amyl ketone, methyl isobutyl ketone, methyl ethyl ketone or acetone; esters, such as, butyl acetate or hexyl acetate; glycol ether esters, such as propylene glycol monomethyl ether acetate; and combination thereof. The composition generally includes in the range of 10% to 85%, preferably 20% to 60%, more preferably 30% to 40% of the aforedescribed solvents, all the percentages being in weight percent based on the total weight of the coating composition. The solvent or a mixture of solvents is typically included in the crosslinking and crosslinkable components. Preferably, the solvents selected or the mixture of solvents is adjusted to render the crosslinkable copolymer miscible in it.

The coating composition of the present disclosure can also contain conventional additives, such as pigments, pigment dispersants, stabilizers, rheology control agents, flow agents, toughening agents and fillers. Selection of such additional additives would, obviously, depend on the intended use of the coating composition. The foregoing additives may be added to either the crosslinkable or crosslinking component, or both, depending upon the intended use of the coating composition. When the present coating composition is used as a primer or a basecoat, typical pigments that can be added to the composition can include, for example, metallic oxides, such as titanium dioxide, zinc oxide, iron oxides of various colors, carbon black; filler pigments, such as talc, china clay, barytes, carbonates, silicates; and a wide variety of organic colored pigments, such as quinacridones, copper phthalocyanines, perylenes, azo pigments, indanthrone blues, carbazoles, such as carbozole violet, isoindolinones, isoindolones, thioindigo reds, benzimidazolinones; metallic flake pigments, such as aluminum flakes.

In addition to the foregoing, to improve weatherability of a clearcoat or pigmented topcoat of the coating composition, the coating composition can include about 0.1 to 5% by weight, based on the weight of the composition solids, of an ultraviolet light stabilizer or a combination of ultraviolet light stabilizers and absorbers may be added. These stabilizers include ultraviolet light absorbers, screeners, quenchers and specific hindered amine light stabilizers. Also, about 0.1 to 5% by weight, based on the weight of the composition solids, of an antioxidant can be added. Most of the foregoing stabilizers are supplied by Ciba Specialty Chemicals, Tarrytown, N.Y.

In use, when the coating composition is packed as a two pack coating composition, the crosslinkable and crosslinking components of the coating composition are mixed just prior to use to form a pot mix, which has limited pot life typically ranging from 10 minutes to 24 hours. A pot mix layer is typically applied to a substrate by conventional techniques, such as spraying, electrostatic spraying, roller coating, dipping or brushing. The pot mix layer then cures under ambient conditions in the range of 10 minutes to 24 hours, preferably in the range of 60 minutes to 16 hours or overnight to form a coating on the substrate having the desired coating properties. It is understood that the actual curing time depends upon the thickness of the applied layer, the type of crosslinking chemistry being used and on the presence or absence of any suitable drying devices, such as fans that assist in continuously flowing air over the coated substrate to accelerate the dry rate. If desired, baking the coated substrate at a temperature of about 60 to 82° C. for about 30 minutes may further accelerate the cure rate.

When the coating composition is packaged as a one-pack composition, a layer of the coating composition is applied in a manner similar to that described earlier. However, since the crosslinking groups in the crosslinking components are blocked, the layer is typically subjected to bake cure temperatures to unblock the crosslinking groups so that they can crosslink with the crosslinkable groups presented in the crosslinkable component. Typically baking step takes place at baking temperatures ranging from 60° C. to 200° C., preferably ranging from 80° C. to 160° C., for about 10 to 60 minutes.

The present disclosure is directed to a method of forming a coating on a substrate, preferably a multi coat OEM or refinish system that includes the coating composition of the present disclosure. In some embodiments, the method for forming a coating on a substrate comprises the steps of;
 a) mixing a crosslinkable component with a crosslinking component to form a pot mix;
 b) applying a layer of the pot mix to a substrate; and
 c) drying and curing the applied layer of pot mix;
wherein, the crosslinking component comprises a crosslinking agent and wherein the crosslinking agent comprises ah isocyanate terminated saturated hydrocarbon polymer. The coating composition may be used as a primer coat, a basecoat in a basecoat/clearcoat system, a clearcoat in a basecoat/clearcoat system, or in a topcoat in a single coat or multi-coat system. Each of these systems is well known in the art.

The present disclosure is also directed to a substrate coated by a coating composition wherein the coating composition comprises a crosslinkable component and a crosslinking component, and wherein the crosslinking component comprises a crosslinking agent wherein the crosslinking agent comprises an isocyanate terminated saturated hydrocarbon polymer. Suitable substrates for applying the coating composition of the present disclosure include resinous automobile bodies, body inserts or body panels, any and all resinous items manufactured and painted by automobile sub-suppliers, commercial resinous truck bodies, including but not limited to beverage transport truck bodies, utility bodies, ready mix concrete delivery vehicle bodies, waste hauling vehicle bodies, and fire and emergency vehicle bodies, as well as any potential resinous attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. The resinous substrate further includes those used in industrial and commercial new construction and maintenance thereof; amusement park equipment; railroad cars; machinery; OEM tools; signage; fiberglass structures; toys; sporting goods; golf balls; and sporting equipment.

The features and advantages of the present disclosure will be more readily understood, by those of ordinary skill in the art, from a reading of the foregoing detailed description. It is to be appreciated that certain features of the disclosure, which are, for clarity, described above in the context of separate embodiments, can also be provided in combination in a single embodiment. Conversely, various features of the disclosure that are, for brevity, described in the context of a single embodiment, can also be provided separately or in any subcombination. In addition, references in the singular can also include the plural (for example, "a" and "an" may refer to one, or one or more) unless the context specifically states otherwise.

EXAMPLES

The change in film hardness of the coating was measured with respect to time by using a Persoz hardness tester Model No. 5854 (ASTM D4366), supplied by Byk-Mallinckfodt, Wallingford, Conn. The number of oscillations (referred to as Persoz number) were recorded.

X-Hatch Adhesion

Using a sharp razor blade, scalpel, knife or other cutting device, two cuts are made into the coating with a 3-45 degree angle between legs and down to the substrate which intersects to form an "X". A steel or other hard metal straightedge is used to ensure straight cuts. Tape is placed on the center of the intersection of the cuts and then removed rapidly. The X-cut area is then inspected for removal of coating from the substrate or previous coating and rated. A standard method for the application and performance of this test is given as ASTM D6677.

Cross-Hatch Adhesion

The cross hatch tape test is primarily intended for use in the laboratory on coatings less than 5 mils (125 microns) thick. It uses a cross-hatch pattern rather than the X pattern. A cutting guide or a special cross-hatch cutter with multiple preset blades is needed to make sure the incisions are properly spaced and parallel. After the tape has been applied and pulled off, the cut area is then inspected and rated. The foregoing test is based on a standard method for the application and performance of these adhesion tests available in ASTM D3359. For the purposes of this disclosure, the adhesion is rated on a sliding scale, which ranges from 0 (no adhesion, i.e., total failure) to 10 (complete adhesion, i.e., total success). A rating of 6 and higher is preferable and a rating of 9 and higher is more preferable.

Preparation of Isocyanate Terminated Saturated Hydrocarbon Polymer 1

The following example shows the preparation of the disclosed isocyanate terminated saturated hydrocarbon polymer. 100 parts by weight of DESMODUR Z4470® isophorone polyisocyanate was added to a reaction vessel under nitrogen and heated to 80° C. To this mixture was added 29.17 parts of KRASOL® HLBH-3000 liquid diol. The reaction was stirred at 80° C. until the isocyanate percentage reached 8.973%. The mixture was cooled to room temperature. The mixture had a solids content of 72.26% and was used as is.

Preparation of Coating Composition 1

The following example shows the preparation of a coating composition containing the isocyanate terminated saturated hydrocarbon polymer of the current disclosure.

28.21 parts of an acrylic polymer solution (having a composition of 16% cyclohexyl methacrylate/64% 2-ethyl hexyl methacrylate/20% 2-hydroxyethyl methacrylate; a number average molecular weight of 4681; a weight average molecular weight of 11,171; a solids content of 58.70%; and a Gardner viscosity of V) was added to a suitable mixing vessel. 2.78 parts of FASCAT® 4202 tin catalyst (available from Arkema, Inc., Philadelphia Pa.) were added followed by 1.11 parts of 6% zinc naphthenate in xylenes. 10.58 parts of was added and the mixture was stirred to produce a homogeneous clear solution. 7.29 parts of isocyanate terminated saturated hydrocarbon polymer 1 was added and the mixture was stirred, resulting in a pot mix having a slight haze.

The pot mix was applied to two Solvay exterior grade thermoplastic olefin panels and to a glass panel with a bird type applicator having a 0.254 mm (0.010 inch) clearance. One of the plastic panels was baked for 30 minutes at 82° C. while the second plastic panel was baked at 121° C. and both panels were allowed to cure further overnight at 25° C. The results are shown in Table 1.

TABLE 1

| | |
|---|---|
| Clarity on glass | Very slight haze |
| Texture on glass | smooth |
| 82° C. X-hatch adhesion on plastic | 10 |
| 82° C. Cross-hatch adhesion on plastic | 10 |

TABLE 1-continued

| | |
|---|---|
| 82° C. Persoz Hardness on plastic | 139 |
| 121° C. X-hatch adhesion on plastic | 10 |
| 121° C. Crosshatch adhesion on plastic | 10 |
| 121° C. Persoz Hardness on plastic | 195 |

The results show that a coating composition comprising the isocyanate terminated saturated hydrocarbon polymer of the current disclosure can provide a cured coating composition that adheres very well to a resinous substrate.

What is claimed is:

1. A crosslinking agent comprising an isocyanate terminated saturated hydrocarbon polymer having a structure according to formula (I), formula (II) or a combination thereof;

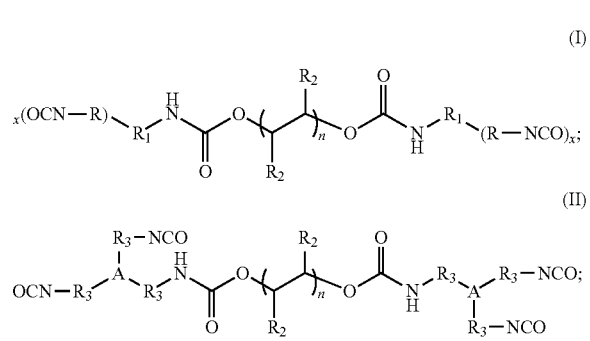

wherein;
the isocyanate terminated saturated hydrocarbon polymer is the reaction product of a saturated hydrocarbon polymer with a polyisocyanate, wherein the saturated hydrocarbon polymer comprises functional groups selected from the group consisting of carboxyl groups, carbamate groups, hydroxyl groups, amino groups, epoxy groups, mercaptan groups, and combinations thereof;
each x independently ranges from 1 to 10;
each R is independently selected from the group consisting of a direct bond and a C1 to C8 alkyl group;
each $R_1$ is independently selected from the group consisting of an unsubstituted C3 to C20 carbocyclic group and a C3 to C20 carbocyclic group substituted with one or more C1 to C6 alkyl groups pendant the ring system;
each $R_2$ is independently selected from the group consisting of H and a C1 to C4 alkyl group;
each $R_3$ is independently a C3 to C20 carbocyclic group optionally substituted with one or more C1 to C6 alkyl groups;
each A is selected from the group consisting of an isocyanurate group, an iminooxadiazine dione group, an allophanate group or a biuret group; and
n ranges from 20 to 700.

2. The crosslinking agent of claim 1 wherein x is 2.

3. The crosslinking agent of claim 1 wherein the isocyanate terminated saturated hydrocarbon polymer is the reaction product of the saturated hydrocarbon polymer and the isocyanurate of isophorone diisocyanate.

4. The crosslinking agent of claim 3 wherein the saturated hydrocarbon polymer comprises 2 to 6 hydroxyl functional groups per polymer chain.

5. The crosslinking agent of claim 4 wherein the isocyanate terminated hydrocarbon polymer is formed from the reaction of an excess of isocyanate groups for each hydroxyl group.

6. The crosslinking agent of claim 5 wherein the ratio of isocyanate groups to hydroxyl groups is in the range of from 1:0.99 to 100:1.

7. A coating composition comprising a crosslinkable component and a crosslinking component wherein the crosslinking component comprises a crosslinking agent comprising an isocyanate terminated saturated hydrocarbon polymer having a structure according to formula (I), formula (II) or a combination thereof;

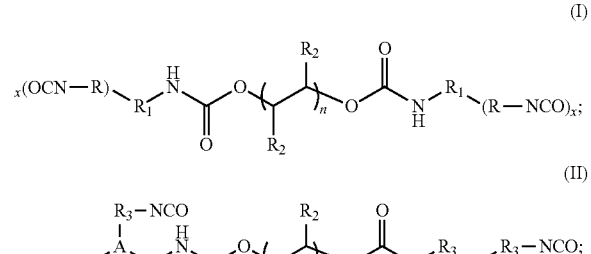

wherein;
the isocyanate terminated saturated hydrocarbon polymer is the reaction product of a saturated hydrocarbon polymer with a polyisocyanate, wherein the saturated hydrocarbon polymer comprises functional groups selected from the group consisting of carboxyl groups, carbamate groups, hydroxyl groups, amino groups, epoxy groups, mercaptan groups, and combinations thereof;
each x independently ranges from 1 to 10;
each R is independently selected from the group consisting of a direct bond and a C1 to C8 alkyl group;
each $R_1$ is independently selected from the group consisting of an unsubstituted C3 to C20 carbocyclic group and a C3 to C20 carbocyclic group substituted with one or more C1 to C6 alkyl groups pendant the ring system;
each $R_2$ is independently selected from the group consisting of H and a C1 to C4 alkyl group;
each $R_3$ is independently a C3 to C20 carbocyclic group optionally substituted with one or more C1 to C6 alkyl groups;
each A is selected from the group consisting of an isocyanurate group, an iminooxadiazine dione group, an allophanate group or a biuret group; and
n ranges from 20 to 700.

8. The coating composition of claim 7 wherein the crosslinkable composition comprises an acrylic copolymer.

9. The coating composition of claim 7 wherein the isocyanate terminated saturated hydrocarbon polymer is the reaction product of a saturated hydrocarbon polymer and the isocyanurate of isophorone diisocyanate.

10. The coating composition of claim 9 wherein the saturated hydrocarbon polymer comprises 2 to 6 hydroxyl functional groups per polymer chain.

11. The coating composition of claim 9 wherein the isocyanate terminated hydrocarbon polymer is formed from the reaction of an excess of isocyanate groups for each hydroxyl group.

12. The coating composition of claim 11 wherein the ratio of isocyanate groups to hydroxyl groups is in the range of from 1:0.99 to 100:1.

13. The crosslinking agent of claim 1 wherein the saturated hydrocarbon polymer comprises from about 45 to about 99 weight percent hydrocarbon units.

* * * * *